Dec. 9, 1969        E. E. EDWARDS        3,482,702
FILTER WITH MEDIA SUPPORTING GRID STRUCTURE
Filed Nov. 22, 1967        6 Sheets-Sheet 1
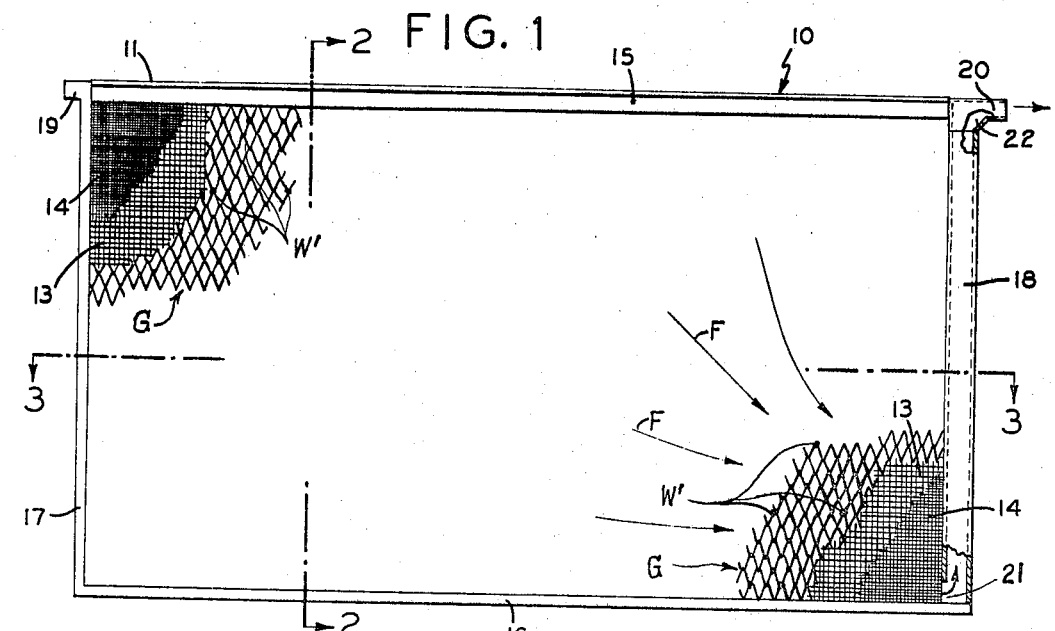
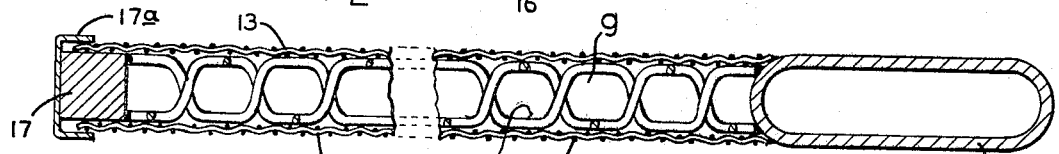
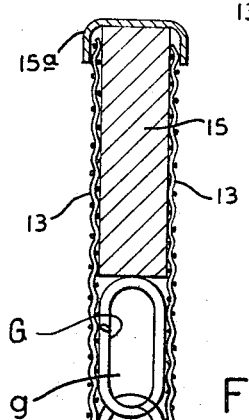
EARL E. EDWARDS
INVENTOR.
BY: *Theodore M. Jablon*
ATTORNEY.

EARL E. EDWARDS
INVENTOR.

Dec. 9, 1969   E. E. EDWARDS   3,482,702
FILTER WITH MEDIA SUPPORTING GRID STRUCTURE
Filed Nov. 22, 1967   6 Sheets-Sheet 3

EARL E. EDWARDS
INVENTOR.

BY: Theodore M Jablon
ATTORNEY.

Dec. 9, 1969    E. E. EDWARDS    3,482,702
FILTER WITH MEDIA SUPPORTING GRID STRUCTURE
Filed Nov. 22, 1967                                6 Sheets-Sheet 4
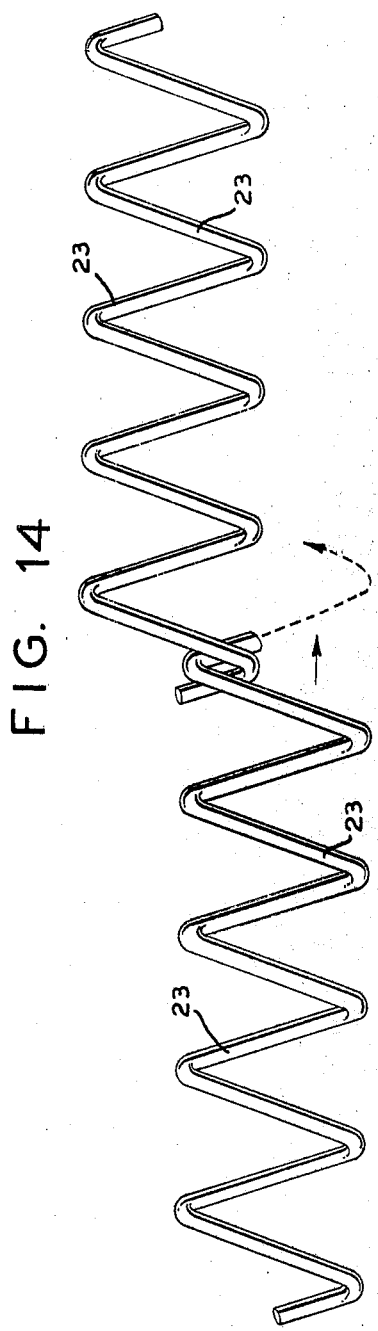
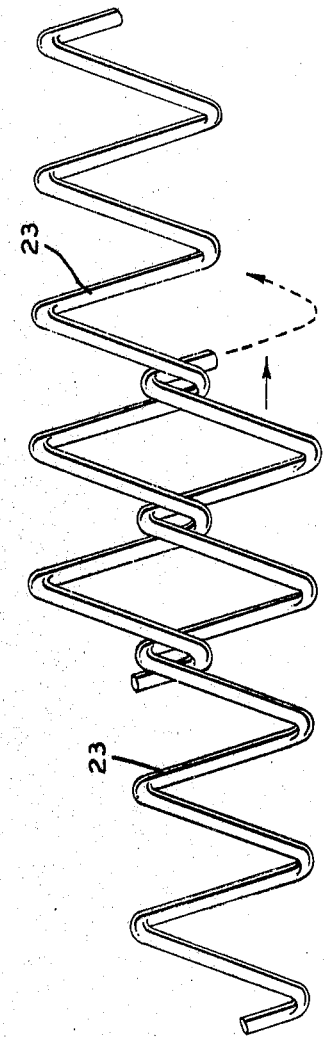
EARL E. EDWARDS
INVENTOR.
BY: Theodore M. Jablon
ATTORNEY.

EARL E. EDWARDS
INVENTOR.

BY: *Theodore M. Jablon*

ATTORNEY.

Dec. 9, 1969   E. E. EDWARDS   3,482,702
FILTER WITH MEDIA SUPPORTING GRID STRUCTURE
Filed Nov. 22, 1967   6 Sheets-Sheet 6

EARL E. EDWARDS
INVENTOR.
BY George S. Hastings
ATTORNEY.

United States Patent Office 3,482,702
Patented Dec. 9, 1969

3,482,702
**FILTER WITH MEDIA SUPPORTING
GRID STRUCTURE**
Earl E. Edwards, Stamford, Conn., assignor to Dorr-
Oliver Incorporated, Stamford, Conn., a corporation of
Delaware
Continuation-in-part of application Ser. No. 590,615,
Oct. 31, 1966. This application Nov. 22, 1967, Ser.
No. 691,092
Int. Cl. B01d 39/10
U.S. Cl. 210—406                                    1 Claim

ABSTRACT OF THE DISCLOSURE

A filter leaf construction consisting of interconnected wire coils forming an open drainage grid of substantial thickness and a woven wire screen for supporting a filter medium overlying both sides of the grid the wire coils being welded to each other to render the grid rigid and the wire screen being welded to both faces of the grid to further strengthen and render rigid the grid as a whole.

---

This application is continuation-in-part of U.S. application Ser. No. 590,615 filed Oct. 31, 1966 by Earl E. Edwards now abandoned.

The invention is particularly useful in filters of the type having rigid leaves of open center construction for drainage and having a filter medium on each face thereof. One example of such filters is the batch pressure filter such as illustrated in Patent No. 1,158,056 to D. J. Kelly, in which a bank of vertically extending filter leaves is contained in a closed pressure vessel to which pulp is fed under pressure forcing the filtrate liquid through the filter media into the interior of the leaves for discharge through conduits to the exterior of the vessel.

After filter cake of suitable thickness has been formed upon each side of the filter leaves, the cover of the pressure vessel is unlocked and the bank of filter leaves withdrawn to enable the filter cake to be removed into a receptacle below.

The invention also has special application to the sector-shaped filter leaves of rotary disc filters of the general type disclosed in United States patent to C. K. Barnes, No. 1,036,174, issued Aug. 20, 1912, in which a plurality of closely spaced discs made up of sector-shaped leaves extend at right angles from and communicate with a hollow rotatable shaft through which cake forming vacuum is applied to the interior of the leaves.

It is an object of this invention to provide a filter leaf having an impoved drainage grid which is inexpensive to fabricate, is light and strong, and gives maximum internal space for drainage of the filtrate liquid in all directions.

Another object is to provide leaves with satisfactory load carrying ability and stiffness within a minimum overall thickness so that more leaves can be included in the same space or more cake space can be provided between leaves.

Still another object is to combine maximum drainage space with an internal structural configuration of truss-like nature which gives exceptional resistance to both edge-wise loads and distortion at right angles to the plane of the leaf.

It is noted that in the leaf type filters, the thinner the leaf the more filter surface can be provided in a given tank or volumetric space while maintaining adequate cake forming space between the facing leaves. However, these leaves are subject to heavy loads, especially in the metallurgical industries when a thick cake builds up on the sides of the leaves. For instance, a 14 x 6 ft. leaf with 1¼ inches of cake thickness on each side of alumina supports a total cake load of approximately 2,000 lbs. Hence, the problem is to provide a leaf bearing such loads with (a) minimum thickness, (b) maximum internal flow space, (c) maximum resistance to edge-wise bending, and (d) maximum resistance to distortion at right angles to the plane of the leaf.

Hence, the general object of applicant's leaf construction is to substantially improve on prior constructions in the above respects and at the same time reduce the cost of manufacture.

Applicant attains the forgoing results by a unique construction of a strong, rigidified, spiral-woven wire fence material as an internal truss work providing open drainage space and by securing an outer woven wire filter medium supporting screen to the outer faces of the spiral fence material as more particularly described below.

FIG. 1 shows the invention embodied in a pressure filter leaf, with parts of the filter media and wire decking broken away to expose the wire grid construction consisting of interlaced coiled wire elements of flattened configuration.

FIG. 2 is a vertical sectional view of the filter leaf, taken on line 2—2 of FIG. 1.

FIG. 3 is a horizontal sectional view of the filter leaf, taken on line 3—3 of FIG. 1.

FIGS. 14 and 15 show progressive stages of threading the coiled wire elements into one another, to produce the hinge connections between respective wire elements.

Figure 16:
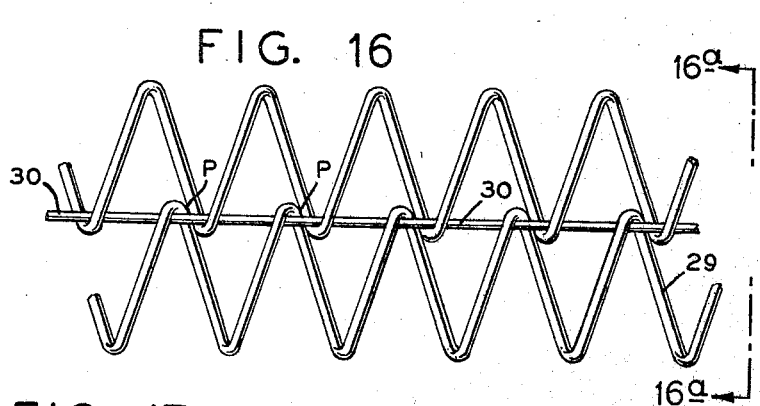
FIGS. 16, 17, 18 are fragmentary views of modified forms of the grid structure, showing a different hinge connection.
Figure 16A:
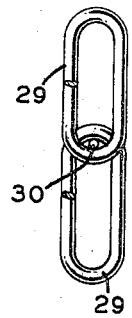
Figure 18:
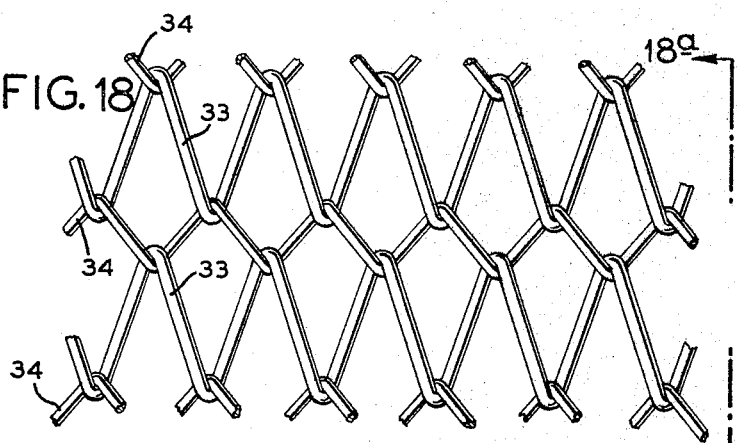
Figure 18A:
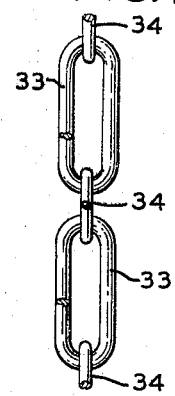

FIGS. 16a, and 18a are end views taken on lines 16a—16a and 18a—18a in FIGS. 16 and 18 respectively.

Figure 19:
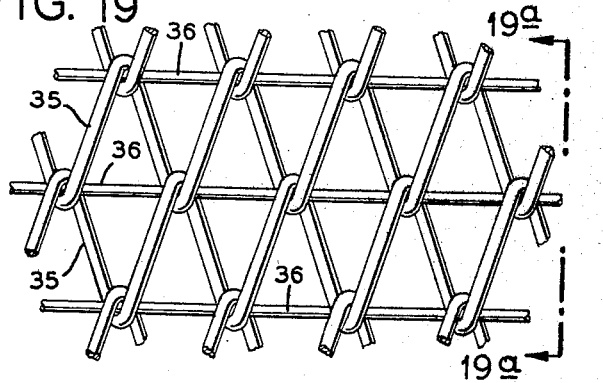

FIG. 19 shows a combination of features of the grid structure of FIGS. 7, 16, 17, and 18.

Figure 19A:

FIG. 19a is an end view taken on line 19a—19a in FIG. 19.

Figure 20:
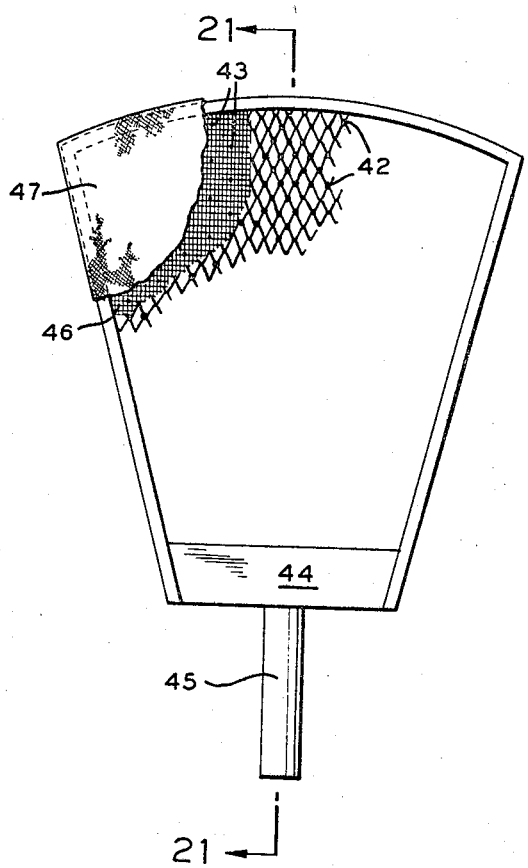

FIG. 20 is a plan view of a disc filter leaf sector embodying the invention showing welding.

Figure 21:
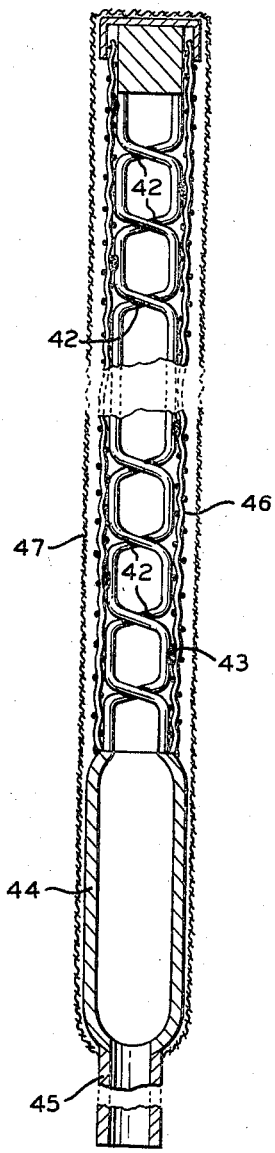

FIG. 21 is an enlarged cross-section on the line 21—21 of FIG. 20.

The pressure filter leaf 10 exemplifying one form of the invention (see FIGS. 1, 2, 3) comprises a rectangular frame 11, and a wide open wire grid structure G of spiral wire mesh fence material fitted into the rectangular opening of the frame 15, 16, 17, 18. The grid structure is marginally fixed or tack-welded to the frame, and is overlain on each side by wire decking consisting of a coarse woven wire mesh 13 which may also be marginally fixed to the frame by soldering or tack welding, and which is covered by the filter media 14 proper. If the filter media be in the nature of a fine wire mesh or the like, it may be marginally soldered to the frame. Otherwise, a bag or filter cloth may be employed, shaped to the dimensions of the frame so as to cover the same.

The rectangular frame itself comprises a horizontal top member 15 and a horizontal bottom member 16, both horizontal members being rigidly interconnected by vertical side members 17 and 18. The ends of the top member have short horizontal extensions or pivots 19 and 20 respectively whereby the frame may be suspended.

When a bank of such filter leaves is in operation in a horizontally extending pressure tank, the filter leaves are located suspended side by side in vertical position and spaced from one another so as to allow for the accumulation of adequate thicknesses of filter cake on the filter media.

With a large commercial size of pressure filter leaf, the load of filter cake clinging to the filter media may amount to two or three thousand pounds. For example, for a filter leaf that is 6 ft. high and 14 ft. wide, the total weight of metallurgical filter cake collected on both sides of the leaf at the end of a normal filtration phase, may be in the order of two thousand pounds. Such weight must be transmitted to the horizontal top member 15 of the frame which thus represents a loaded end-supported beam. According to the invention, a particularly favorable load transmission to the beam 15 is achieved through the novel grid construction G of this invention, as will be explained below.

Accordingly (see FIGS. 2 and 3) the cross-sectional dimension of the top member 15 of the frame is larger than the one side member 17 and the horizontal bottom member 16. The other side member 18 of the frame is the form of a tube of flattened cross-sectional configuration providing an upflow duct for discharging filtrate liquid from the interior of the leaf, the liquid (see flow lines F) entering this duct through a bottom opening 21 and exiting through a top opening 22 by way of the hollow pivot 20 of the frame.

The top and bottom members 15 and 16 as well as the one side member 17 of the frame are capped by channel members 15a, 16a and 17a respectively, providing recesses for accommodating the respective adjoining edge portions of the wire decking 13. The fourth edge portion of the wire decking is tack-welded to the vertical duct member of the frame as indicated in FIG. 3.

When installing the grid structure one may fit the wire grid structure into the frame and after eliminating the slack in the hinge connections, the edges of the grid structure may be affixed or tack-welded to the surrounding frame. Another mode of installation is to prepare the grid structure so that it will become substantially rigidified, which comprises eliminating the slack in the hinge connections A and fixing at least some of the hinge connection as by spot welding thereof.

In a preferred embodiment as illustrated in FIGS. 4 to 9, the grid structure comprises a multitude of coiled metal wire elements 23 (FIGS. 4, 5, 6) which have been threaded into one another or interlaced in the manner illustrated in FIGS. 14 and 15, resulting in a coarse mesh grid structure (FIGS. 7, 8, 9) having hinge connections A.

The individual wire coil element in the combination may be of any suitable and feasible shape. In the present embodiment, it is shown to be of an ovally elongated configuration having a width W and a depth D (see FIG. 5) and comprising flat or straight intermediate portions 23a and 23b and rounded end portions 23c and 23d, the depth D providing drainage space for the filtrate liquid.

In the pressure leaf of FIGS. 1, 2, and 3, the planar wire grid structure is installed in the frame with the coiled wire elements and their hinge lines running vertically, that is parallel to the side members of the frame and in the direction of major downward stress. A number of the articulations or hinge connections may be rigidified by a system of scattered spot-welding points after undue slack has been taken up in the hinge connections, and the grid structure then edgewise tack-welded to the surrounding frame. Vice versa, the edge portions of the grid structure may first be tack-welded, this to be followed by the spot-welding of the hinge connections.

The spiral wire coils are of open construction with a pitch of the coils to the longitudinal axis of the coil of from 20 to 45 degrees being suitable, in order to permit free drainage of filtrate sidewise through the coils as well as axially thereof.

It will be observed that each of the coiled wire elements in this arrangement forms with an adjoining wire element a horizontal row of parallelograms within a general pattern defined by inclined intersection lines L–1 and L–2 producing in effect diagonal tension members running from top to bottom of the frame. In this grid pattern, vertical loads upon the grid structure, such as imposed by the aforementioned weight of the filter cake clinging to the filter media, are well distributed throughout the entire area of the grid. This in turn results in a favorable distribution of the loading stress on and minimum deflection of the top member 15 of the frame. Any suitable pattern of spot-weld points W may be applied to the articulations of the grid structure of FIG. 1 which will render the grid rigid. However, it has been found to give adequate strength and rigidity in the leaf shown in FIG. 1 if each link is welded to the next in horizontal lines extending across the leaf in the direction of greatest length, i.e. perpendicular to the direction of greatest edgewise stress, each line being spaced approximately 5 or 6 meshes from the line above or below, being about 12 inches for large leaves on the order of 14 ft. long and 6 ft. high. This has the effect of making every hinge of the vertical spirals rigid.

These welds render the otherwise flexible spiral mesh into a 3-dimensional truss work which is rigid over the entire area of the mesh, and highly resistant both to edgewise and sidewise bending of the grid. This same three-dimensional effect of coils, provides ideal drainage space through the open coils, in any direction minimizing flow resistance.

The strength of the leaves is very substantially increased by welding or otherwise fixedly securing the finer, but nevertheless coarse wire screen 13 woven preferably of metal wires of substantial tensile strength to the outer surfaces of the wire coils on both side of the spiral mesh. This forms a strong stiff sandwich of high tensile outer material secured to the internal three-dimensional truss work. It has been found on large leaves, for example 14 x 6 ft., to be satisfactory to electrically spot-weld the screen to the coils at positions spaced 12 inches apart both vertically and horizontally.

As an example, leaves 14 ft. long horizontally and 6 ft. high formed and welded as above described having a thickness of 1⅛ inch (as compared with the 1½ inch thickness of the leaves formerly used) were tested by supporting the leaves in vertical position solely by their upper corner lugs at each end of the 14 ft. length and attaching lead weights evenly distributed along the horizontal 14 ft. long lower edge. This sample tested was made of spiral steel wire the spiral having a pitch to axis angle of about 45°, the wire having a diameter of .162 inch. The diameter and pitch of the spirals was such as to result in a 2 inch mesh. The woven wire medium supporting screen was of ¼ inch mesh and made of wire .072 inch in diameter with the crossing strands of wire at right angles to each other and running vertically and horizontally respectively of the filter leaf as above positioned.

1st test—Static load—2,440 lbs.
 Results: 7/16 inch vertical deflection
 No side deflection
 Back to zero deflection when weights were removed.
2nd test—Static load—3,000 lbs.
 Result: 9/16 inch vertical deflection
 No side deflection
 Back to zero deflection when weights were removed.

When assemblies the filter leaf of FIG. 1, the procedure may be first to fasten the articulated grid structure to the horizontal top member of the frame, the frame lying flat upon a supporting surface, and to erect the frame to a vertical position with the grid structure then hanging like a curtain and thereby taking up the slack in the hinge connections, and then fasten the other sides of the grid structure to the respective adjoining members of the frame. Thereafter, points of articulation in this grid structure may be rigidified as by spot-welding.

Another procedure of installation may be to assemble the frame and grid structure while lying flat on a supporting surface, then to fasten the sides and to fasten the edge portions of the grid structure to respective adjoining members of the frame, and then rigidifying the articulations as by spot-welding.

Figure 10:
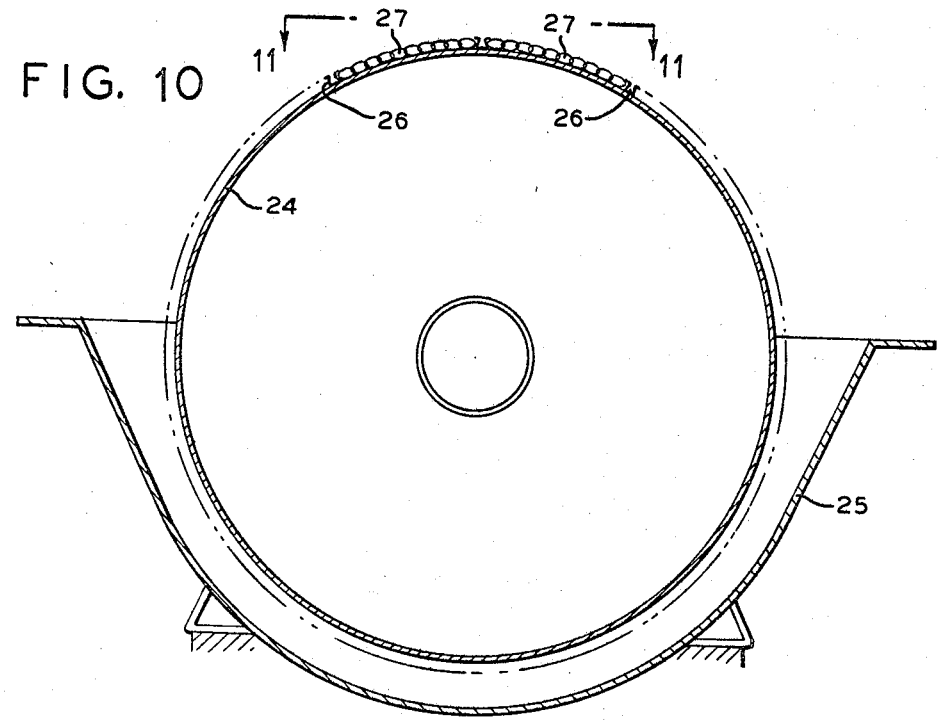
FIG. 10 shows the invention embodied in the curved filter cells of the filter drum in a continuous rotary drum filter.

Referring to FIGS. 10 to 13 it will be seen that due to the hinge connections this grid structure may readily conform to the curvature of the filter cells in the filter drum of a continuous rotary vacuum drum filter such as schematically shown in FIG. 10. Briefly, this filter drum comprises a drum cylinder 24, the ends of which have outward rims 24a and 24b respectively. This filter drum is mounted for rotation by means of its end trunnions upon the end walls of a vat 25 continuously receiving the pulp or suspension to be filtered, and wherein the filter drum is partially immersed. Upon the drum cylinder are provided divider strips or channels 26 parallel to the drum axis and spaced from one another and together with peripheral channels 26a along the rim portions of the drum defining shallow filter cells.

Figure 11:
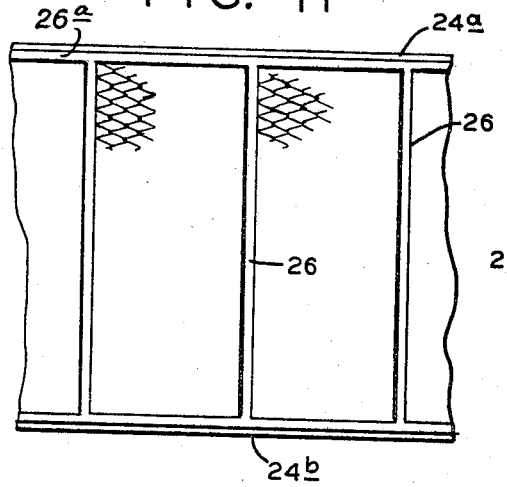
FIG. 11 is a top view taken on line 11—11 of FIG. 10, showing the filter cells appearing at the top of the filter drum, and the featured wire grid structures installed therein.
Figure 12:
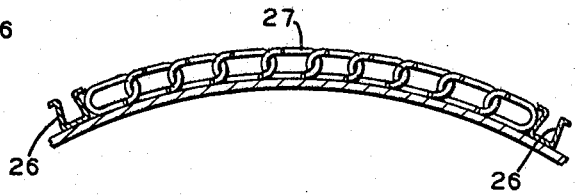
FIG. 12 illustrates the manner of shaping the grid structure to the curvature of the filter drum.
Figure 13:
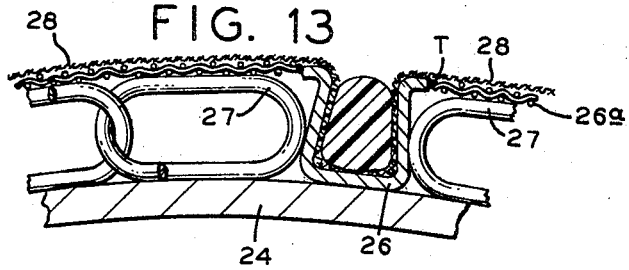
FIG. 13 is a greatly enlarged detailed view taken from FIG. 12, clearly showing the mounting of the grid structures on the filter drum.

The articulated grid structure 27 in this embodiment will conform to the cylindrical curvature of the supporting bottom of these cells, and may be installed therein in a manner shown in FIGS. 11, 12, 13. That is to say, if properly dimensioned the articulated grid structure may be lowered into this curved cell, and after sufficiently eliminating the slack from the hinge connections, the edges of the grid structure may then be fastened to respective adjoining portions of the cell, for example by means of tack-welding or any other suitable fastening or positioning means. The grid may then be rendered rigid so as to retain its curvature when removed by welding the articulations of the grid structure hitherto described.

Another mode of installation would be to shape the articulated grid structure to the desired cylindrical surface which may be that of the drum cylinder itself, or utilizing a similarly shaped auxiliary jig surface after the slack in the articulations has been eliminated, and then rigidifying the hinge connections as by spot-welding. The thus rigidified grid structure conforming to the curvature of the drum cylinder, may then be inserted into the filter cell conforming to the cylindrically convex supporting surface thereof.

The length of the coiled wire elements preferably extends in a direction parallel to the divider strips.

Wire decking 26a is laid over each curved grid structure and held in place by, for instance, marginal tack-welding T as shown in FIG. 13. The curved grid may be further rigidified by spot-welding the wire decking to the grid structure. Filter cloth 28 may be applied to cover each cell, and marginally fastened in the dovetail grooves or channels surrounding each cell, in a manner well known in he filter art, and indicated in FIG. 13.

Figure 4:
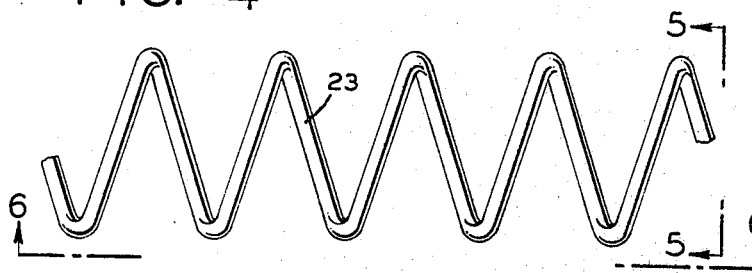
FIG. 4 shows the flat side of one of the coiled wire elements.
Figure 5:
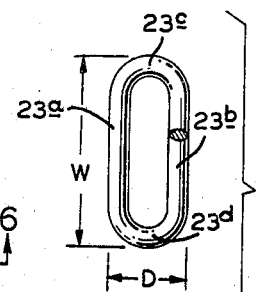
FIG. 5 is an end view of the coiled wire element, taken on line 5—5 of FIG. 4.
Figure 6:
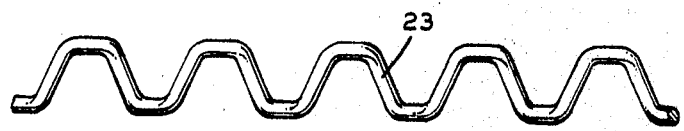
FIG. 6 is a view upon the narrow side of the wire element, taken on line 6—6 in FIG. 4.
Figure 7:
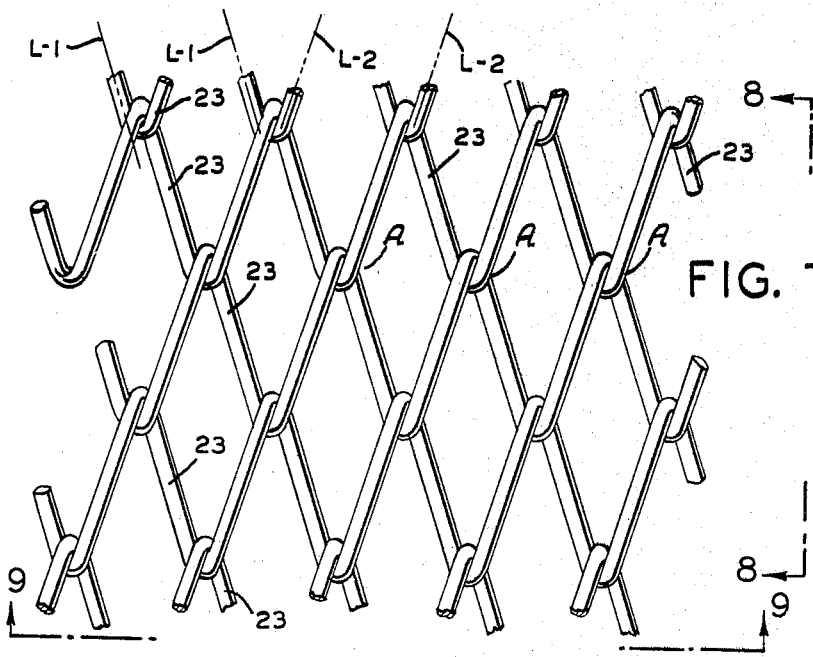
FIG. 7 shows an enlarged fragmentary portion of the wire grid structures comprising the coiled wire elements, as taken from FIG. 1.
Figure 8:
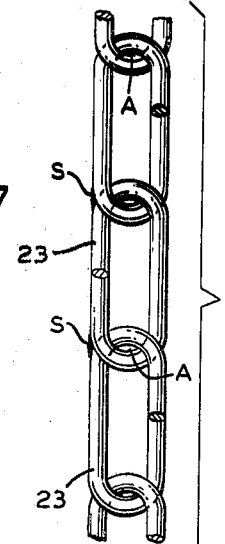
FIG. 8 is an end view taken on line 8—8 in FIG. 7.
Figure 9:
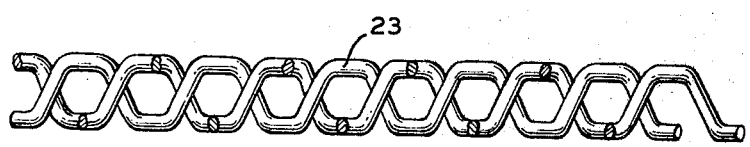
FIG. 9 is a view taken on line 9—9 in FIG. 7.

In the embodiment of the wire grid structure as shown in FIGS. 16 and 16a, while the coiled wire elements 29 per se may be of the same shape as those in the above described embodiment of FIGS. 7 to 9, they are hinged to one another by means of a hinge wire 30, instead of being threaded directly into one another. In this embodiment the respective windings of mutually adjoining coiled wire elements are shown asymmetrically spaced, that is in close proximity or touching one another at points P.

Figure 17:
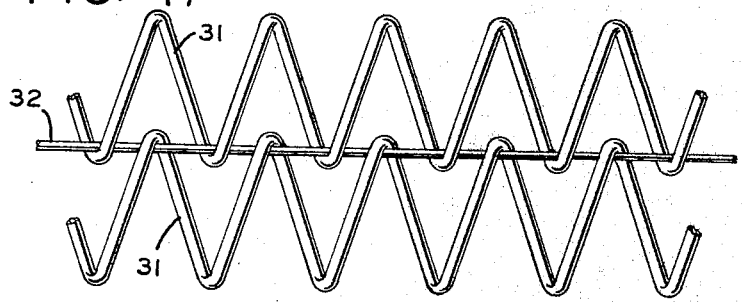

The embodiment of FIG. 17 while similar to the arrangement of FIG. 16 with respect to the coiled wire elements 31 and the hinge wire 32 connecting them to one another has the coiled wire element symmetrically spaced from one another.

In the embodiment of FIG. 18, the coiled wire elements 33 are connected to one another by means of a hinge wire 34 having zigzag configurations.

The grid structure according to the embodiment in FIG. 19 and 19a combines features of the foregoing embodiments. Accordingly, the grid structures comprises coiled wire elements 35 threaded into one another, and an additional wire 36 extending through the hinge connections substantially coinciding with the hinging axis. If a suitable number of hinging points including points in each hinge line are then rigidified as by spot-welding, the resulting grid structure itself will then be rigidified in two directions, namely in the direction of the hinging axes as well as in the direction at right angles thereto. Hence, a grid structure thus rigidified will effectively absorb and transmit the vertical load from the filter cake in a pressure filter leaf irrespective of whether the hinging axes run horizontally parallel, or vertically at right angles to the top member 15 of the frame.

FIGS. 20 and 21 disclose the invention applied to a filter leaf sector of a rotary disc filter of the type disclosed in the aforesaid U.S. Patent No. 1,036,174. In this form the spiral grid G is formed of the interengaging coils extending vertically with the sector positioned as in FIG. 20 or radially as installed in the disc filter with the hinge lines in the same direction. While spot-welds 42 may be at all or scattered hinge positions, welds are preferably at every link hinge in a horizontal or perpendicular to radial lines and spaced a few meshes, for example 8 inches apart, in a vertical, i.e. radial direction, on a 10 or 12 ft. diameter disc filter.

Overlying the spiral coil grid G is a coarse woven wire deck 46, welded at spaced spot-welds 43 to the flattened sides of the coils, and covered by filter medium bag 47. Suction and drainage of filtrate is through the open coils into the channel of frame 44 and out through vacuum and drainage conduit 45.

Thus the same advantages already referred to with respect to the form disclosed in FIG. 1 are attained by applicant's unique grid and deck construction applied to a disc filter.

From the foregoing it will be seen that the invention provides a wire grid structure for filter media, and methods of making the same, wherein a multitude of coiled wire elements of adequate stiffness are hinged laterally to one another. The cross-sectional configuration or shape of the wire coils determines the spacing or depth of drainage space between the filter media or wire decking and a supporting plane. Because of the hinge connections or articulated character this grid structure may readily conform to a planar or to a curved supporting face. This grid structure thus constructed is wide open, affording drainage in all directions with a minimum of flow resistance. Some or all of the points of hinge connection between the wire coils may be rigidified as by spot-welding and the resulting grid may be further rigidified and strengthened by spot-welding the medium supporting deck to the coils to form a rigid unified sandwich construction.

I claim:
1. An elongated rectangular filter leaf having upper, lower and side frame members with supporting means adjacent the upper end corners of the leaf for supporting the leaf in a vertical plane with its longer sides generally horizontal whereby the leaf is subject to heavy vertical stresses when loaded, a wire mesh grid secured in said frame comprising generally vertical coils extending between and secured to said upper and lower frame members, adjacent coils being interengaged to form contacting hinge joints along a vertical hinge line, said contacting joints being spot welded to rigidly secure every coil to the adjacent coils along a plurality of vertically spaced horizontal lines of welds rendering the mesh grid rigid and providing a series of tension members running diagonally from the top frame member to the bottom frame member, said coils being flattened at either face of the grid, a woven wire screen of finer mesh than the grid spot welded to the flattened portion of said coils to form a rigid sandwich construction, and a filter medium secured over each of said screens, one of said frame members being hollow and communicating with the space within the coils, and with the exterior for withdrawing filtrate from within the filter leaf.

References Cited

UNITED STATES PATENTS

| 2,409,705 | 10/1946 | Reinhardt | 210—486 |
| 3,363,770 | 1/1968 | Glos | 210—347 X |
| 1,997,713 | 4/1935 | Boehm | 209—401 X |
| 2,723,032 | 11/1955 | Gisler et al. | 209—401 |
| 3,327,866 | 6/1967 | Pall et al. | 209—401 X |
| 2,134,703 | 11/1938 | Cobb | 210—404 X |

FOREIGN PATENTS 320,108  8/1902  France.

OTHER REFERENCES

Architectural Record, July 1964, vol. 7, pp. 152–154.

REUBEN FRIEDMAN, Primary Examiner

T. A. GRANGER, Assistant Examiner